United States Patent [19]

Brown

[11] 3,855,207
[45] Dec. 17, 1974

[54] 9ALPHA,11ALPHA-EPOXY SPIROLACTONES, SPIROLACTOLS AND LACTOL ETHERS CORRESPONDING

[75] Inventor: Edward A. Brown, Glenview, Ill.

[73] Assignee: G. D. Searle & Co., Chicago, Ill.

[22] Filed: Nov. 19, 1973

[21] Appl. No.: 417,376

Related U.S. Application Data

[63] Continuation-in-part of Ser. No. 220,441, Jan. 24, 1972, abandoned.

[52] U.S. Cl..... 260/239.55 R, 260/239.57, 260/999
[51] Int. Cl........................................... C07c 173/00
[58] Field of Search ....../Machine Searched Steroids

[56] References Cited
UNITED STATES PATENTS

| | | | |
|---|---|---|---|
| 3,095,412 | 6/1963 | Brown | 260/239.57 |
| 3,268,521 | 8/1966 | Pike | 260/239.57 |
| 3,342,813 | 9/1967 | Sarel et al. | 260/239.57 |
| 3,431,258 | 3/1969 | Lefebure et al. | 260/239.57 |

*Primary Examiner*—Henry A. French
*Attorney, Agent, or Firm*—John A. Dhuey

[57] ABSTRACT

9α,11α-Epoxy-4',5'-dihydrospiro[androst-4-ene-17,2'(3'H)-furan]-3,5'-dione is converted to the 5α and 5β isomers of 9α,11α-epoxy-4',5'-dihydrospiro[androstane-17,2'(3'H)-furan]-3,5'-dione and its corresponding lactol and lactol ethers. These compounds are useful as pharmacological agents as demonstrated by their hypotensive and anti-desoxycorticosterone acetate activity.

9 Claims, No Drawings

9 ALPHY, 11 ALPHA-EPOXY SPIROLACTONES, SPIROLACTOLS AND LACTOL ETHERS CORRESPONDING

This application is a continuation-in-part of my copending application Ser. No. 220,411, filed Jan. 24, 1972 now abandoned.

This invention is concerned generally with spirolactones and their derivatives. In particular, it is concerned with 9α, 11α-epoxy spirolactones, spirolactols and lactol ethers of the following structural formula

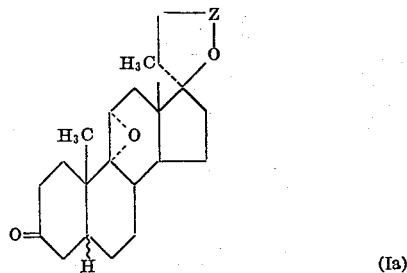

wherein Z is a carbonyl radical or a radical of the formula

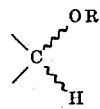

with R being a hydrogen or lower alkyl radical and the wavy lines indicating the α or β configuration or the epimeric mixture thereof.

The lower alkyl radicals represented by the above formula are methyl, ethyl, propyl, butyl, pentyl, hexyl, heptyl and the branched-chain isomers thereof.

Equivalent to the instant lactones [i.e., the compounds of formula (Ia) wherein Z is a carbonyl radical] for the purposes of this invention are the corresponding hydroxy acids and salts of the general formula

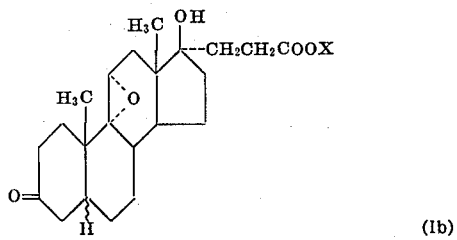

wherein X is hydrogen, alkali metal, alkaline-earth metal/2 or ammonium.

Preferred alkali metals and alkaline-earth metals encompassed by the X term in formula (Ib) include potassium, sodium, lithium, magnesium and calcium. Those skilled in the art will recognize that the term "alkaline-earth metal/2" is dictated by the fact that alkaline-earth metals are divalent, whereas the other groups represented by X are monovalent; and when, for example, X represents Ca/2 in formula (Ib), the contemplated salts are more conventionally depicted thus

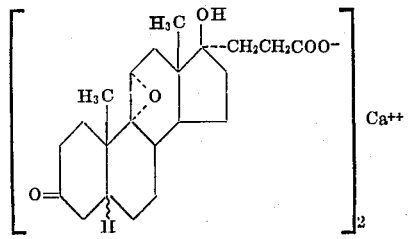

The instant compounds are prepared conveniently from 9α, 11α-epoxy-4',5'-dihydrospiro[androst-4-ene-17,2'(3'H)-furan]-3,5'-dione, the preparation of that compound being described in U.S. Pat. No. 3,095,412. Hydrogenation of that starting material in the presence of a suitable catalyst such as a palladium-on-carbon catalyst affords the 5β-product of formula (Ia), namely 9α, 11α-epoxy-4', 5'-dihydrospiro[5β-androstane-17,2'(3'H)-furan]-3,5'dione. Treatment of that compound with methanol and p-toluene-sulfonic acid yields the 3,3-dimethoxy derivative, which is reduced with lithium and ammonia to yield the instant 9α,11α-epoxy-4',5'-dihydro-5'-hydroxyspiro[5β-androstane-17,2'(3'H)-furan]-3-one. The alkyl ethers of formula (Ia) then are produced by allowing the latter lactol to react with the appropriate alkanol in the presence of acid. Typically, 9α,11α-epoxy-4',5'-dihydro-5'-hydroxyspiro-[5β-androstane-17,2'(3'H)-furan]-3-one is treated with methanol in the presence of hydrochloric acid to afford 9α,11α-expoxy-4',5'-dihydro-5'-methoxyspiro[5β-androstane-17,2'(3'H)-furan]-3-one.

The 5α-derivatives of formula (Ia) may be prepared by contacting the aforementioned starting material, 9-α,11α-epoxy-4',5'-dihydrospiro[androst-4-ene-17,2'(3'H)-furan]-3,5'-dione, with lithium and ammonia to produce 9α,11α-epoxy-4',5'-dihydrospiro-[5α-androstane-17,2'(3'H)-furan]-3,5'-dione and 9α,11α-epoxy-4',5'-dihydro-5'-hydroxyspiro[5α-androstane-17,2'(3'H)-furan]-3-one. The latter compound can be converted to the corresponding alkyl ethers by the manner described for the 5β-compounds.

Reaction of a compound of formula (Ia) wherein Z is carbonyl with one equivalent of an alkali metal hydroxide affords the corresponding alkali metal salt of formula (Ib). This reaction is conveniently conducted in an aqueous medium, preferably in an aqueous alkanol, e.g. methanol. If desired, the resultant salt of formula (Ib) can be exposed to a proton source for a short period of time, thus affording the corresponding acid of formula (Ib). Thus, subsequent brief contact of an alkali metal salt of formula (Ib) with a mineral acid, e.g. hydrochloric acid, under very dilute conditions, affords the corresponding compound of formula (Ib) wherein X is hydrogen.

Contacting a compound of formula (Ib) wherein X is hydrogen with one equivalent of a suitable base, e.g. an alkali metal or alkaline-earth metal hydroxide, preferably in an aqueous alkanol, will afford the desired alkali metal or alkaline-earth metal/2 salt.

The ammonium salts of formula (Ib) can be prepared from the corresponding compounds of formula (Ib) wherein X is hydrogen by treatment with excess ammonia, suitably in an organic solvent such as 2-propanol.

The instant compounds exhibit valuable pharmacological, e.g. hypotensive and anti-desoxycorticosterone acetate, activity and thus they are useful as pharmacological agents. The anti-desoxycorticosterone acetate activity is determined by an assay described in U.S. Pat. No. 3,412,094 and the hypotensive activity is determined by the following assay.

The test procedure makes use of the fact that chronic administration of desoxycorticosterone acetate induces a self sustaining hypertension that is similar in many respects to essential hypertension in man (D. N. Green et al., *American Journal of Physiology*, 170, 94, 1952). In this test, 50-g. male Charles River rats are implanted with a 20 mg. wax pellet containing 10 mg. of desoxycorticosterone acetate. After 5 weeks, their systolic blood pressures are measured electrosphygmographically on the tail artery. The following day, groups of 5 rats are then given 60 mpk. of test compound intragastrically. 4 hours later, the blood pressures are again measured and the decrease in pressure from control day is calculated and compared with concurrent controls. The compound is considered active if it produces a significant decrease in systolic blood pressure.

The invention will appear more fully from the examples which follow. They are not to be construed as limiting either in spirit or in scope as many modifications both in materials and methods will be apparent to one skilled in the art. In the examples which follow, temperatures are given in °C. and quantities of material in parts by weight unless parts by volume is specified. The relationship between parts by volume and parts by weight is the same as that existing between milliliters and grams.

EXAMPLE 1

A solution of 3.0 parts of 9α,11α-epoxy-4',5'-dihydrospiro[androst-4-ene-17,2'(3'H)-furan]-3,5'-dione in 222 parts of tetrahydrofuran is subjected to catalytic hydrogenation with 0.3 part of 5 percent palladium-on-carbon as catalyst for 5½ hours at a hydrogen pressure of 1 atmosphere. After filtration to remove the catalyst and evaporation to remove the solvent, the remaining material is recrystallized from acetone to yield pure 9α,11α-epoxy-4',5'-dihydrospiro[5β-androstane-17,2'(3'H)-furan]-3,5'-dione. That compound also can be named as 9α,11α-epoxy-17α-hydroxy-3-oxo-5β,17α-pregnane-21-carboxylic acid γ-lactone. It melts at about 247°–248° and is structurally represented by the following formula

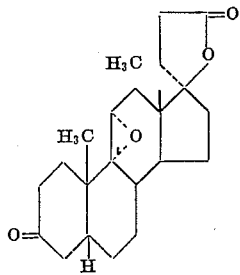

EXAMPLE 2

To a suspension of 2.7 parts of 9α,11α-epoxy-4',5'-dihdrospiro[5β-androstane-17,2'(3'H)-furan]-3,5'-dione in 47.5 parts of methanol is added 0.100 part of p-toluenesulfonic acid monohydrate. Stirring the suspension for about 5 minutes produces complete solution, and after 5 hours, 0.5 part of pyridine is added and the solution is transferred into a mixture of ice and water. The precipitate which forms is collected, washed with water and air dried to yield 9α,11α-epoxy-3,3-dimethoxy-4',5'-dihydrospiro[5β-androstane-17,2'(3'H)-furan]-5'-one, melting at about 95°–100°.

EXAMPLE 3

To 200 parts by volume of liquid ammonia is added, with stirring, 0.45 part of lithium wire and then, over a 5 minute period, a solution of 2.7 parts of 9α,11α-epoxy-3,3-dimethoxy-4',5'-dihydroxpiro[5β-androstane-17,2'(3'H)-furan]-5'-one in 88.8 parts of tetrahydrofuran. 3 Minutes after the addition is completed, the solution is decolorized by the addition of 0.6 part of ammonium chloride. After the ammonia has evaporated, 700 parts of water is added. The separated oil is isolated by decantation of the upper aqueous layer and then dissolved in methylene chloride. The methylene chloride solution is washed with water and dried over sodium sulfate. The material which remains after removal of the solvent is dissolved in 7.92 parts of methanol and 1 drop of concentrated hydrochloric acid is added. After 1 hour at room temperature, water is added and the precipitate which forms is collected. That precipitate is dissolved in ethyl acetate, washed with water and dried over anhydrous sodium sulfate. Evaporation of the solvent under reduced pressure leaves 9α,11α-epoxy-4',5'-dihydro-5'-methoxyspiro[5β-androstane-17,2'(3'H)-furan]-3-one, as an amorphous solid. That compound is structurally represented by the following formula

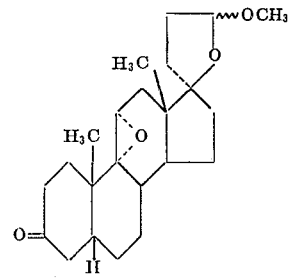

The upper aqueous layer from above is extracted with methylene chloride and the solution then is washed with water and dried over anhydrous sodium sulfate. After evaporation of the solvent, the residue is subjected to preparative thin layer chromatography on silica gel using 70 percent ethyl acetate:30 percent benzene as the developing solvent. The least polar component is isolated and recrystallized from ethyl acetate to yield, 9α,11α-epoxy-4',5'-dihydro-5'-hydroxyspiro[5β-androstane-17,2'(3'H)-furan]-3-one, as an epimeric mixture, melting at about 135°–150°. That compound is represented by the following structural formula

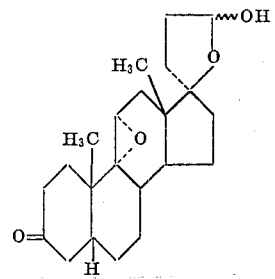

EXAMPLE 4

To 220 parts by volume of liquid ammonia is added with stirring 0.45 part of lithium wire. Then over an 8 minute period, a solution of 3.0 parts of 9α,11α-epoxy-4',5'-dihydrospiro[androst-4-ene-17,2'(3'H)-furan]-3,5'-dione in 97.8 parts of tetrahydrofuran is added. 2 Minutes after the addition is completed, the solution is decolorized by the addition of 0.7 part of ammonium chloride. Ammonia is allowed to evaporate for 72 hours and then 700 parts of water is added. The resulting precipitate is recovered by filtration and recrystallized from ethyl acetate to yield pure 9α,11α-epoxy- 4',5'-dihdro-5'-hydroxyspiro-[5α-androstane-17,2'(3'H)-furan]-3-one, melting at about 184°-189°. That compound is structurally represented by the following formula

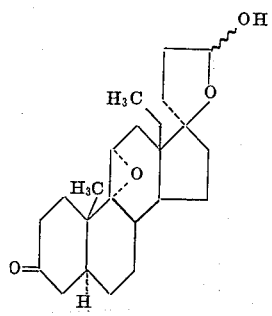

Acidification of the above aqueous filtrate produces a precipitate which is subjected to chromatographic purification on silica gel using chloroform as an eluting solvent. The first peak fraction is recrystallized from ethyl acetate to yield 9α,11α-epoxy-4',5'-dihydrospiro[5α-androstane-17,2'(3'H)-furan]-3,5'-dione. That compound, which can also be named as 9-α,11α-epoxy-17-hydroxy-3-oxo-5α,17α-pregnane-21-carboxylic acid γ-lactone, is structurally represented by the following formula

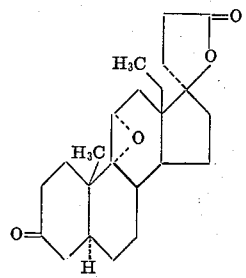

EXAMPLE 5

An equivalent quantity of ethanol is substituted in the procedure of Example 3, thus producing 9α,11α-epoxy-4',5'-dihydro-5'-ethoxyspiro[5β-androstane-17,2'(3'H)-furan]-3-one.

EXAMPLE 6

A mixture of 0.73 part of 9α,11α-epoxy-17-hydroxy-3-oxo-5α,17α-pregnane-21-carboxylic acid γ-lactone, 2.7 parts by volume of 0.73 N aqueous potassium hydroxide solution and 31.6 parts of methanol is warmed gently to effect solution. The mixture is allowed to stand for approximately 16 hours at room temperature, then is heated at 40°-50°C. for 40 minutes and stripped of solvent under reduced pressure. The gummy residue is further dried azeotropically by distillation with ethanol. Trituration of the residue with ethyl ether affords potassium 9α,11α-epoxy-17-hydroxy-3-oxo-5α,17α-pregnane-21-carboxylate.

EXAMPLE 7

To a solution of 1.0 part of potassium 9α,11α-epoxy-17-hydroxy-3-oxo-5α,17α-pregnane-21-carboxylate in 70 parts of water is added 20 parts of 5 percent hydrochloric acid. The resultant precipitate is filtered off, washed with water and dried in air. The material thus isolated is 9α,11α-epoxy-17-hydroxy-3-oxo-5α,17α-pregnane-21-carboxylic acid.

EXAMPLE 8

A mixture of 200 parts of 9α,11α-expoxy-17-hydroxy-3-oxo-5α,17α-pregnane-21-carboxylic acid, 19 parts of calcium hydroxide and 4,000 parts of 20 percent aqueous methanol is stirred at 40° C. under nitrogen for 2 hours. Solvent is then removed by vacuum distillation and the residue is recrystallized from ethyl acetate. The product thus isolated is calcium bis-[9α,11α-epoxy-17-hydroxy-3-oxo-5α,17α-pregnane-21-carboxylate].

EXAMPLE 9

To 20 parts of 2-propanol, saturated with ammonia, is added 1 part of 9α,11α-epoxy-17-hydroxy-3-oxo-5α,17α-pregnane-21-carboxylic acid. The resulting mixture is allowed to stand at room temperature for 24 hours, at which point solvent is removed by vacuum distillation. The residue is washed with ethyl acetate and dried in air, affording ammonium 9α,11α-epoxy-17-hydroxy-3-oxo-5α,17α-pregnane-21-carboxylate.

What is claimed is:

1. A compound formula

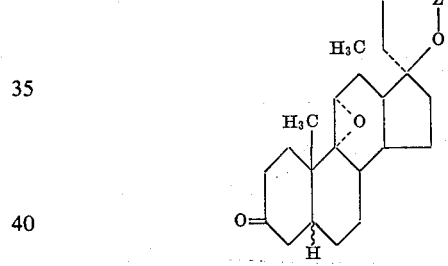

wherein Z is selected from the group consisting of carbonyl, hydroxymethylene and (lower alkoxy)methylene radicals and the wavy line represents the α or β configuration.

2. As in claim 1, a compound of the formula

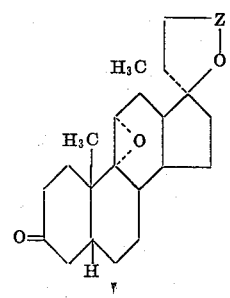

wherein Z is selected from the group consisting of carbonyl, hydroxymethylene and (lower alkoxy)methylene radicals.

3. As in claim 1, a compound of the formula

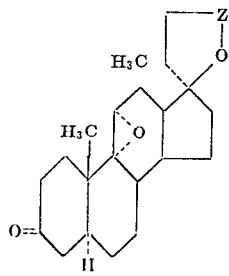

wherein Z is selected from the group consisting of carbonyl, hydroxymethylene and (lower alkoxy)methylene radicals.

4. As in claim 1, a compound of the formula

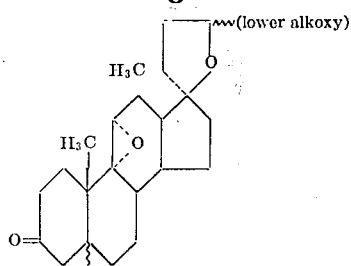

wherein the wavy lines represent the alternative α or β configuration or the epimeric mixture.

5. As in claim 1, the compound which is 9α,11α-epoxy-4′,5′-dihydrospiro[5β-androstane-17,2′-(3′H)-furan]-3,5′-dione.

6. As in claim 1, the compound which 9α,11α-epoxy-4′,5′-dihydro-5′-methoxyspiro[5β-androstane-17,2′(3′H)-furan]-3-one.

7. As in claim 1, the compound which is 9α,11α-epoxy-4′,5′-dihydro-5′-hydroxyspiro[5β-androstane-17,2′(3′H)-furan]-3-one.

8. As in claim 1, the compound which is 9α,11α-epoxy-4′,5′-dihydro-5′-hydroxyspiro[5α-androstane-17,2′(3H)-furan]-3-one.

9. As in claim 1, the compound which is 9α,11α-epoxy-4′,5′-dihydrospiro[5α-androstane-17,2′-(3′H)-furan]-3,5′-dione.

* * * * *

UNITED STATES PATENT OFFICE
CERTIFICATE OF CORRECTION

PATENT NO. : 3,855,207
DATED : Dec. 17, 1974
INVENTOR(S) : Edward A. Brown

It is certified that error appears in the above-identified patent and that said Letters Patent are hereby corrected as shown below:

Column 2, line 29, "α,11α" should be -- 9α,11α --.

Column 5, line 1, "-[" should be -- [ --.

Column 8, line 14, "2'-(" should be -- 2'( --.

Column 8, line 27, "2'-(" should be -- 2'( --.

Formula in Claim 1,

"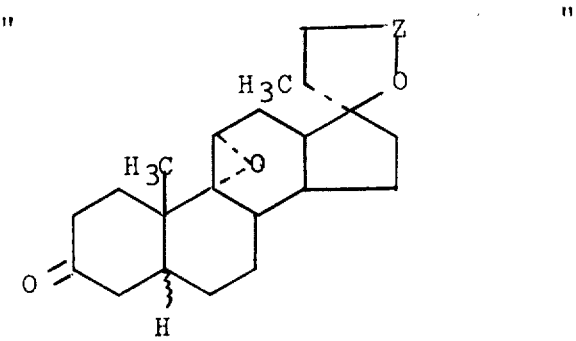"

should read --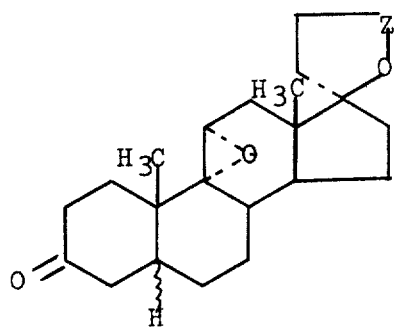--.

UNITED STATES PATENT OFFICE
CERTIFICATE OF CORRECTION

PATENT NO. : 3,855,207
DATED : Dec. 17, 1974
INVENTOR(S) : Edward A. Brown

It is certified that error appears in the above-identified patent and that said Letters Patent are hereby corrected as shown below:

Formula in Claim 2, "

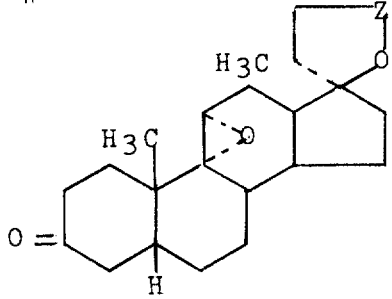

should read --

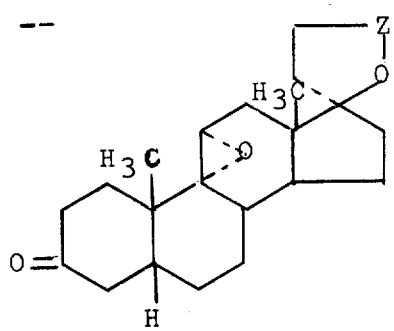

--.

Formula in Claim 3, "

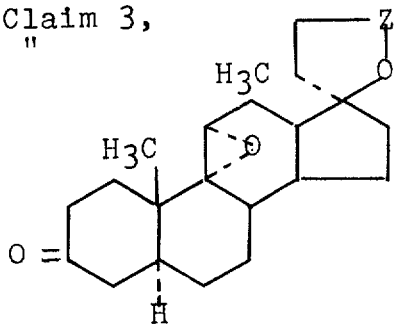

"

UNITED STATES PATENT OFFICE
CERTIFICATE OF CORRECTION

PATENT NO. : 3,855,207
DATED : Dec. 17, 1974
INVENTOR(S) : Edward A. Brown

It is certified that error appears in the above-identified patent and that said Letters Patent are hereby corrected as shown below:

should read -- 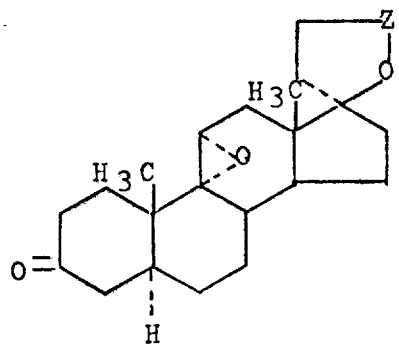 --.

Formula in Claim 4, " 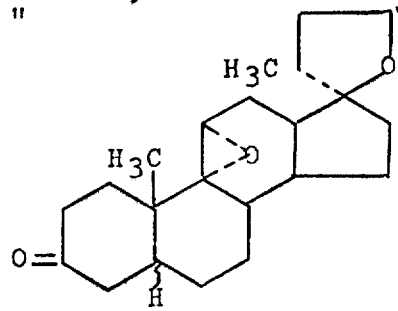 (lower alkoxy) "

should read -- 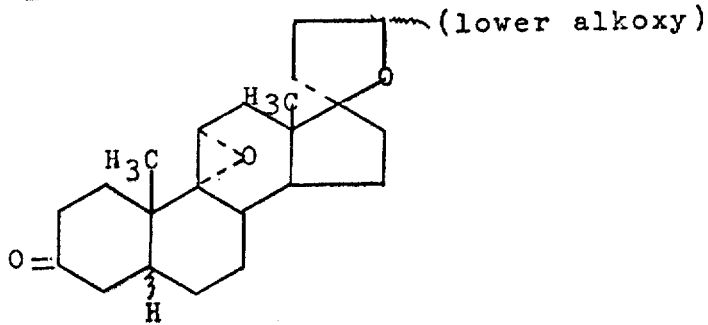 --.

Signed and Sealed this fourteenth Day of October 1975

[SEAL]

Attest:

RUTH C. MASON

C. MARSHALL DANN